(12) United States Patent
Bakk et al.

(10) Patent No.: US 12,207,371 B2
(45) Date of Patent: Jan. 21, 2025

(54) METHOD FOR FUNCTIONAL CLASSIFICATION OF LUMINAIRES

(71) Applicant: Tridonic GmbH & Co KG, Dornbirn (AT)

(72) Inventors: Istvan Bakk, Torokbalint (HU); Christian Fragner, Loipersdorf (AT); Anna Werkovits, Graz (AT)

(73) Assignee: Tridonic GmbH & Co KG, Dornbirn (AT)

(*) Notice: Subject to any disclaimer, the term of this patent is extended or adjusted under 35 U.S.C. 154(b) by 122 days.

(21) Appl. No.: 17/909,772

(22) PCT Filed: Feb. 23, 2021

(86) PCT No.: PCT/EP2021/054472
§ 371 (c)(1),
(2) Date: Sep. 7, 2022

(87) PCT Pub. No.: WO2021/180468
PCT Pub. Date: Sep. 16, 2021

(65) Prior Publication Data
US 2023/0100783 A1    Mar. 30, 2023

(30) Foreign Application Priority Data
Mar. 11, 2020 (EP) .................................. 20162422

(51) Int. Cl.
*H05B 47/12* (2020.01)
*G06F 18/2411* (2023.01)
(Continued)

(52) U.S. Cl.
CPC ......... *H05B 47/12* (2020.01); *G06F 18/2411* (2023.01); *G06F 18/24147* (2023.01); *H05B 47/155* (2020.01); *H05B 47/19* (2020.01)

(58) Field of Classification Search
CPC ........... G06F 18/2411; G06F 18/24147; H05B 45/10; H05B 47/105; H05B 47/115;
(Continued)

(56) References Cited

U.S. PATENT DOCUMENTS

2014/0100835 A1* 4/2014 Majumdar ......... G06Q 30/0261
703/11
2015/0130373 A1   5/2015 Van De Sluis et al.
(Continued)

FOREIGN PATENT DOCUMENTS

WO   WO-2012137046 A1 * 10/2012   ......... H05B 37/0227

OTHER PUBLICATIONS

PCT/EP2021/054472, International Search Report and Written Opinion, Mar. 29, 2021, 16 pages.

*Primary Examiner* — Raymond R Chai
(74) *Attorney, Agent, or Firm* — Andrus Intellectual Property Law, LLP

(57) ABSTRACT

A method (20) for functional classification of luminaires (101a-d) arranged as a grid (100) has luminaires (101a-d) with at least two different sensors (103, 105, 107), such as at least two of a light sensor (103), an acoustic sensor (105) and a motion sensor (107). Output signals of the sensors (103, 105, 107) are supplied to a controller (109), and are wirelessly forwarded (23) along with timestamps and luminaire IDs to a gateway and then transmitted to a central database (403). The timestamps are used to correlate the sensor information signals (130) over a defined period of time, and to generate (27) functional classification information based on the correlations found. The functional classification information indicates a likelihood function of a certain usage of each luminaire, out of a given set of usage functions.

13 Claims, 6 Drawing Sheets

(51) Int. Cl.
*G06F 18/2413* (2023.01)
*H05B 47/155* (2020.01)
*H05B 47/19* (2020.01)

(58) Field of Classification Search
CPC ...... H05B 47/12; H05B 47/155; H05B 47/19; Y02B 20/40
See application file for complete search history.

(56) References Cited

U.S. PATENT DOCUMENTS

| | | | |
|---|---|---|---|
| 2019/0045300 A1* | 2/2019 | Cho | F21K 9/20 |
| 2019/0200437 A1* | 6/2019 | Eves | G05B 15/02 |
| 2022/0280072 A1* | 9/2022 | Timofejevs | G06F 18/24147 |
| 2022/0408532 A1* | 12/2022 | De Oliveira Fanti | H05B 47/105 |
| 2024/0038037 A1* | 2/2024 | Horling | H05B 47/115 |

* cited by examiner

METHOD FOR FUNCTIONAL CLASSIFICATION OF LUMINAIRES

CROSS REFERENCE TO RELATED APPLICATIONS

The present application is the U.S. national stage application of international application PCT/EP2021/054472 filed Feb. 23, 2021, which international application was published on Sep. 16, 2021 as International Publication WO 2021/180468 A1. The international application claims priority to European Patent Application No. 20162422.8 filed Mar. 11, 2020.

TECHNICAL FIELD OF THE INVENTION

The invention relates to method for functional classification of luminaires, in particular luminaires that are arranged as a grid of a plurality of luminaires, and to a system comprising such luminaires.

BACKGROUND OF THE INVENTION

Many environments, such as buildings, comprise a large grid of luminaires which are distributed in the environment to ensure that every place in the environment can be illuminated adequately, e.g. every room in the building.

It is known to additionally arrange various types of sensors, e.g. motion sensors or noise sensors, in such an environment to collect environmental information, e.g. information about the presence or distribution of people in the environment. This information can be used to control the luminaire grid.

However, it is difficult and costly to distribute, network and power a sufficient number of different environmental sensors in parallel to the luminaire grid.

In addition, it is often cumbersome to group the plurality of luminaires. There can be several use cases for the luminaires, which require different groupings, e.g. for activating different illumination scenes, which need to be set manually. Often the grouping depends on the type of environment, e.g. work space, public space or storage space, and needs to be updated when the use of the environment changes or when new furniture is installed.

The grouping can comprise a classification of the luminaires. A manual classification of luminaires by their application area is very time intensive. Often hundreds of luminaires are installed and each luminaire is configured, e.g. by defining thresholds for dim levels, according to its installation condition.

Thus, it is an objective of the invention to provide an improved method for a functional classification of luminaires and an improved system comprising a grid of a plurality of luminaires, which avoid the above-mentioned disadvantages.

SUMMARY OF THE INVENTION

The object of the present invention is achieved by the solution provided in the enclosed independent claims. Advantageous implementations of the present invention are further defined in the dependent claims.

According to a first aspect, the invention relates to a method for functional classification of luminaires, the luminaires being arranged as a grid of a plurality of luminaires, each of the luminaires comprising at least two different sensors, preferably at least two of a light sensor, an acoustic sensor, and/or a motion sensor; the method comprising the steps of:

supplying output signals of said sensors to a controller,
preferably wirelessly forwarding sensor information signals including timestamps and luminaire IDs (identifiers) to a central database,
correlating the sensor information signals over a defined period of time, and
generating functional classification information based on the correlations found,
wherein the functional classification information indicates a likelihood function of a certain usage of each luminaire, out of a given set of usage functions.

This achieves the advantage that the luminaires can be classified efficiently based their intended usage and/or the usage of the environment. Thereby, the usage of the luminaires can be determined efficiently based on environmental information collected with sensors of the luminaires.

In particular, the grouping can adapt to changes in the environment and no manual grouping and/or commissioning needs to be done.

Preferably, depending on the most likely usage of each luminaire, the luminaire behaves differently. For instance, one or more operating parameters of the luminaire, e.g. brightness during a movement, brightness in an empty room, rate of change between two brightness levels (fade time), profile when changing between two brightness levels (linear, graduated, exponential, logarithmic etc.) are adjusted based on the functional classification information.

The grid of luminaires can be arranged in a building. For example, the grid can be arranged in an office space, a school, or a retail environment.

The sensor information signals can further comprise sensor values that can be based on the output signals of the respective sensors.

In particular, each sensor information signal can comprise at least one luminaire identifier (ID), at least one timestamp and at least one sensor value.

Preferably, each output signal, in particular each sensor value, can be associated with a timestamp of the corresponding measurement and the luminaire ID of the luminaire equipped with the respective sensor that conducted the measurement.

Integrating various sensors in each luminaire of the grid, allows collecting a large number of sensor data from various places in the environment. By evaluating this data, information about the environment can be gained, e.g. about the type or use of the environment. This information can be used for classifying the luminaires.

In an embodiment, the set of usage functions comprises at least the categories "work space" and "non-work space".

This achieves the advantage that the luminaires can be classified efficiently based on their intended uses and/or on the environment in which they are installed.

Preferably, the usage functions comprise a plurality of categories, such as "meeting room", "laboratory", "hospital room", "storage room", "workshop" or "sales rooms". In particular, the same luminaire can be used in different ways, e.g. illuminating a small area in a room or uniformly illuminating the entire room depending on the use of the room and/or a presence of people in the room.

In an embodiment, the functional classification information comprises a noise classification with at least two of the classes: speech, chatter, burst-type sounds, knocking-tapping-type sounds, white noise, and street noise.

This achieves the advantage that the luminaires can be grouped efficiently based on different uses of the luminaires and/or the environment in which they are installed.

In particular, the likelihood function for each luminaire is at least partially based on the noise classification. Preferably, the noise classification is performed based on an audio power spectral distribution pattern measured by the at least two sensors, in particular by the acoustic sensor.

In an embodiment, the controller is arranged for forwarding the sensor information signals repetitively with a constant or a varying, especially adaptive, frequency.

This achieves the advantage that changes in the environment over time can be observed and considered when classifying the luminaires.

In an embodiment, said sensor information signals comprise a sensor value, wherein the sensor value represents an amplitude of the output signal at the time of the associated timestamp.

This achieves the advantage that sensor values that are sufficient to detect changes in the environment can be forwarded to the central database. In particular, only isolated sensor values, e.g. a noise level every few seconds, are forwarded, but no sound recordings or video recordings.

In an embodiment, the step of correlating the sensor information signals comprises generating a time series of sensor values, in particular sensor values of a motion sensor and/or an acoustic sensor, at different timestamps and analyzing a duration of the time series and the amplitudes of the sensor values in the time series.

This achieves the advantage that the sensor information can be correlated efficiently based on sensor recordings over time.

Preferably, the duration of the time series and the amplitudes of the sensor values can be parametrized as "presence time of people", for instance values with lower amplitudes, and "number of transitions of people", for instance values attributed to higher amplitudes and low duration. This parametrization can be used in order to determine the most likely usage of each luminaire.

In an embodiment, the functional classification information is generated based on a comparison of the duration of the time series and the amplitudes of the sensor values in the time series with a reference dataset, in particular by means of a supervised learning algorithm.

This achieves the advantage that the functional classification can be generated efficiently based on reference data.

Preferably, the category for each luminaire, e.g. "work space" or "non-works space", is determined based on the comparison of the duration of the time series and the amplitudes of the sensor values in the time series with the reference dataset.

In an embodiment, the functional classification information is generated based on a classification algorithm, such as a k-nearest neighbor algorithm, a support vector machine or a similar approach.

This achieves the advantage that the functional classification can be generated efficiently based on reference data.

In particular, generating the functional classification information may comprise classifying the time series dataset.

In an embodiment, the step of correlating encompasses a supervised learning method and/or a k-nearest neighbor computation.

This achieves the advantage that the sensor information can be correlated efficiently.

In an embodiment, said sensor information signals are forwarded using a low energy short range wireless standard such as the BLUETOOTH® standard.

In an embodiment, the method further comprises the step of: outputting the usage of each luminaire, in particular the usage with the highest likelihood, at a user interface.

This achieves the advantage that the result of the grouping can be provided to a user for information and further analysis.

According to a second aspect, the invention relates to a system comprising a grid of a plurality of luminaires, each of the luminaires comprising at least two sensors, preferably at least two of a light sensor, an acoustic sensor and/or a motion sensor; wherein the system further comprises a controller supplied with the output signals of said sensors; an interface, preferably a wireless interface; a data processing unit and a central database; wherein the interface is configured to forward sensor information signals including timestamps and luminaire IDs to the central database; wherein the data processing unit is configured to correlate the sensor information signals in the central database over a defined period of time; and wherein the data processing unit is configured to generate a functional classification information based on the correlations found, wherein the functional classification information indicates a likelihood function of a certain usage of each luminaire, out of a given set of usage functions.

This achieves the advantage that the luminaires can be classified efficiently based their intended usage or the usage of the environment. Thereby, the usage of the luminaires can be determined efficiently based on environmental information collected with sensors of the luminaires.

The above description with regard to the method for functional classification of luminaires according to the first aspect of the invention is correspondingly valid for the system according to the second aspect of the invention.

BRIEF DESCRIPTION OF THE DRAWINGS

The invention will be explained in the followings together with the figures.

DETAILED DESCRIPTION OF THE PREFERRED EMBODIMENTS

Figure 1A:
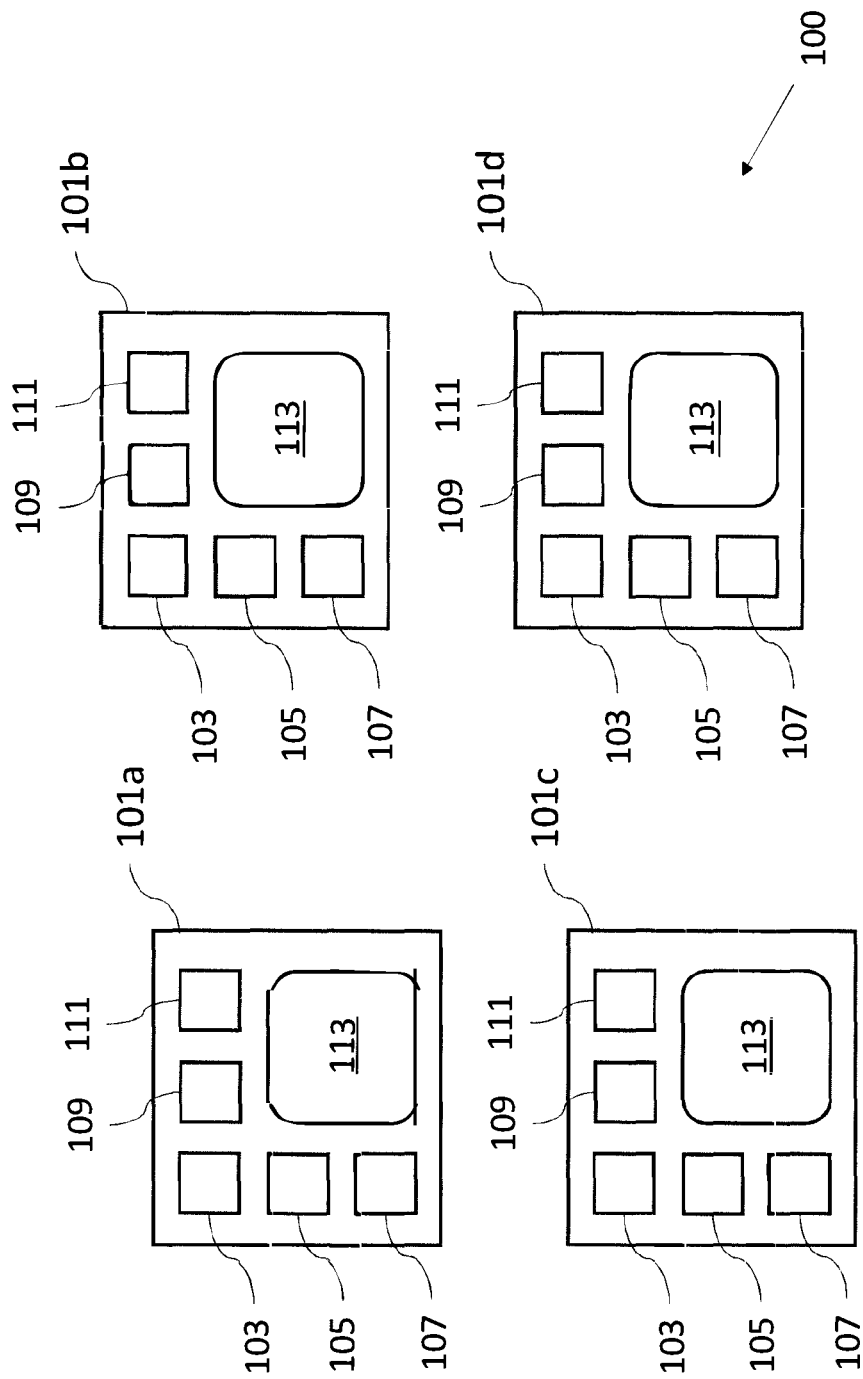
FIG. 1a shows a schematic diagram of a grid of a plurality of luminaires according to an embodiment.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

The term "LED luminaire" shall mean a luminaire with a light source comprising one or more LEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

FIG. 1a shows a schematic diagram of a grid 100 of a plurality of luminaires 101a-d according to an embodiment.

Each of the luminaires 101a-d in the grid 100 comprises a light sensor 103, preferably a daylight sensor, an acoustic sensor 105, a motion sensor 107, a controller 109 supplied with the output signals of said sensors 103, 105, 107, and a wireless interface 111 for a communication between the controller 109 and a gateway for forwarding sensor information signals to a central database (not shown in FIG. 1a).

The grid 100 can be arranged in an environment, in particular a building. Since luminaires 101a-d are typically evenly distributed over such an environment, equipping each luminaire 101a-d with sensors 103, 105, 107 leads to a good coverage of the environment with the sensors. Equipping luminaires with sensors has the additional advantage that no extra planning or commissioning for mounting external sensors in the environment has to be done.

In particular, the wireless interface 111 is configured to communicate with the gateway (not shown), in particular to forward the sensor information signals to the gateway. The gateway can be a wireless gateway.

Preferably, each luminaire 101a-d in the grid 100 comprises a light source 113, in particular a plurality of LEDs.

Each of the luminaires 101a-d can be a downlight luminaire, a linear luminaire, an area light or a multi-purpose light. In particular, the grid 100 comprises different types of luminaires at different locations in the environment.

The controller 109 can be a micro controller unit (MCU).

Preferably, the controller 109 of each luminaire 101a-d is arranged for forwarding the sensor information signals repetitively with a constant or a varying, especially adaptive, frequency. In particular, the controller 109 is configured to control the wireless interface 111 to forward the sensor information signals.

Preferably, the wireless interface 111 of each luminaire 101a-d comprises a low energy short range wireless communication interface such as BLUETOOTH® interface.

The sensor information signals can comprise a timestamp, an identifier of the respective luminaire (luminaire ID) and a sensor value. Via the timestamp and the identifier, the sensor value can be correlated to a place and time in the environment. In this way, a 2D mapping of the sensor values, e.g. anisotropic analog data, can be generated based on data stored in the central database. For instance, the 2D mapping shows a noise level or a brightness in the environment at different times during the day.

The acoustic sensor 105 of each luminaire 101a-d can be a noise detector. In particular, the acoustic sensor 105 is configured to detect a sound pressure level and/or sound patterns such as voice or burst sounds.

The motion sensor 107 can be a Doppler based motion sensor, i.e. a sensor that detects motion based on the Doppler effect. In particular, the motion sensor 107 is configured to detect a motion intensity.

The light sensor 103 can be configured to detect a light intensity, e.g. of daylight.

The grid 100 can comprise multiple luminaires 101a-d equipped with the same type and number of sensors. Alternatively, luminaires 101a-d of one grid 100 may comprise different sensors.

Figure 1B:
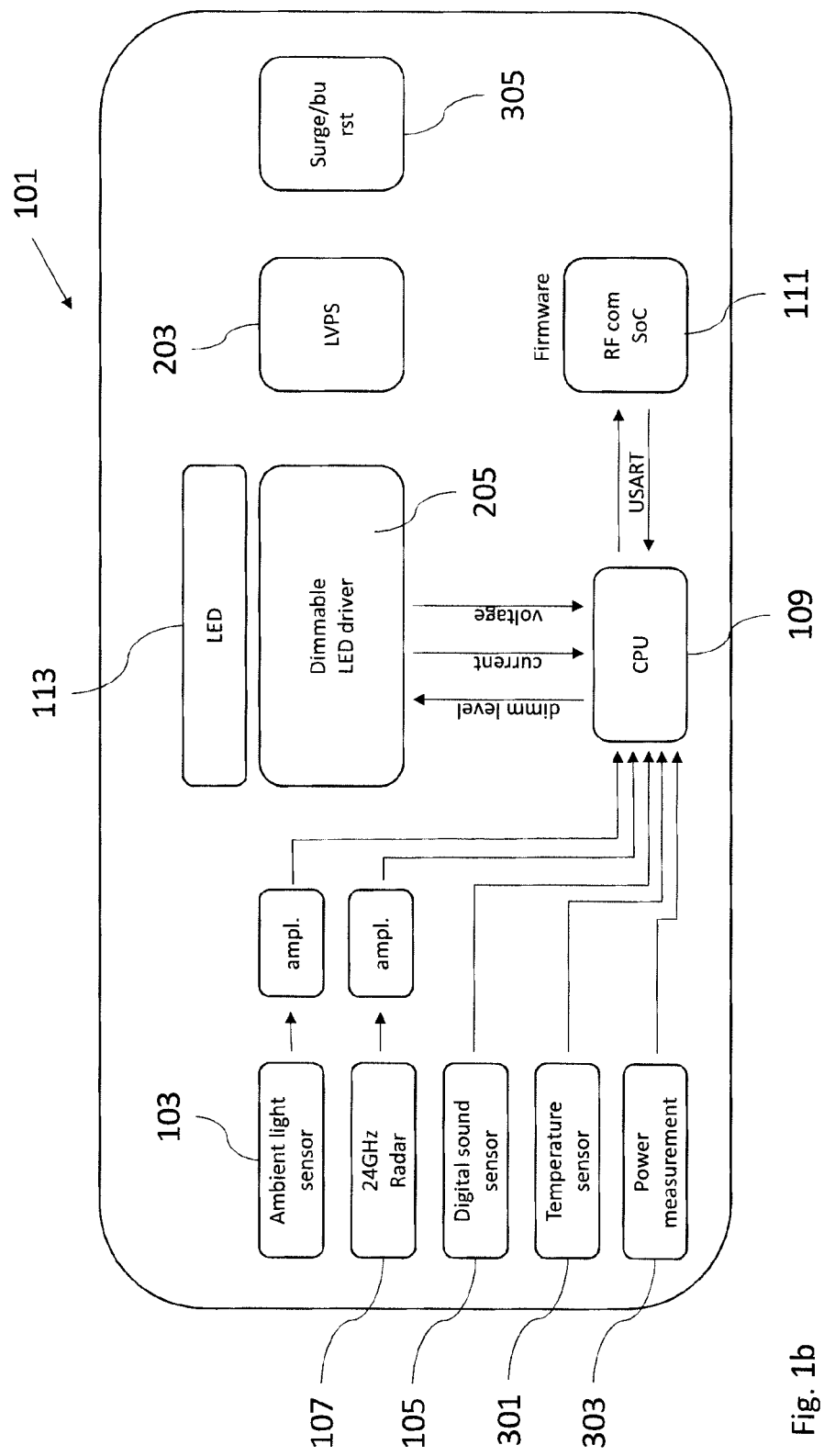
FIG. 1b shows a schematic diagram of a luminaire according to an embodiment.

FIG. 1b shows a schematic diagram of a luminaire 101 according to an embodiment.

In particular, the luminaire 101 shown in FIG. 1b is an exemplary embodiment of a luminaire 101a-b of the grid 100, as for example shown in FIG. 1a.

The luminaire 101 comprises the light sensor 103, the motion sensor 107, e.g. in form of a 24 GHz radar sensor, and the acoustic sensor 105, e.g. in form of a digital sound sensor.

The luminaire 101 can further comprises a temperature sensor 301 and a power measurement unit 303, e.g. for measuring a power consumption by the luminaire 101.

Furthermore, the luminaire 101 can comprises a vibration sensor (not shown), e.g. for detecting vibrations in the ceiling.

Preferably, the sensors 103, 105, 107, 301 and 303 are configured to forward sensor values to the controller 109. In FIG. 1b, the controller comprises a CPU.

The sensor values can comprise amplitudes of detected signals, for instance, a brightness value detected by the light sensor 103 or a velocity of a movement detected by the motion sensor.

The luminaire 101, as shown in FIG. 1b, comprises a dimmable LED driver 205 connected to the light source 113, wherein the light source 113 comprises LEDs. The controller 109 can be configured to control a dim level of the light source 113. The controller 109 can further be configured to receive information on a voltage or current consumption of the LEDs.

The wireless interface 111 can be configured to communicate with the controller 109 via the USART (Universal Synchronous/Asynchronous Receiver Transmitter) protocol.

The wireless interface 111 can be integrated in the luminaire 101 as a system on a chip (SoC).

The luminaire can further comprise a surge/burst protection unit 305.

Figure 2:
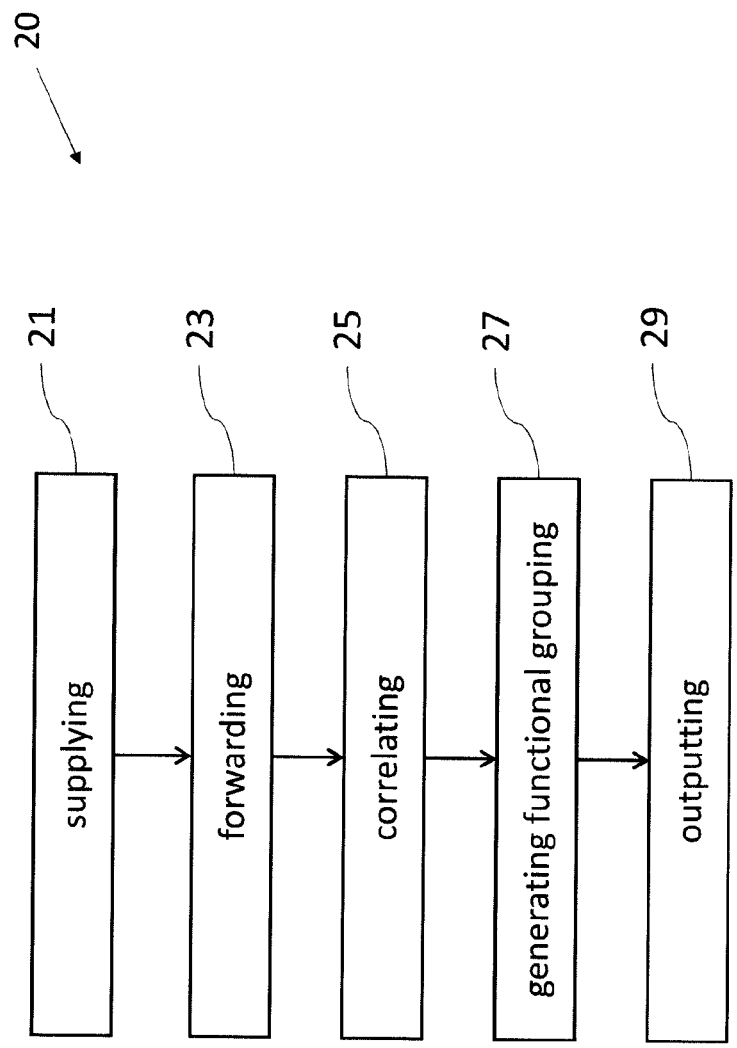
FIG. 2 shows a schematic diagram of a method for functional classification of luminaires according to an embodiment.

FIG. 2 shows a schematic diagram of a method 20 for functional classification of the luminaires 101a-d according to an embodiment.

The luminaires 101a-d are arranged as a grid 100 of a plurality of luminaires 101a-d, wherein each of the luminaires 101a-d comprises at least two different sensors. In particular, each luminaire comprises at least two of the light sensor 103, preferably the daylight sensor, the acoustic sensor 105 and/or the motion sensor 107.

The method 20 comprises the steps of:
supplying 21 output signals of said sensors 103, 105, 107 to a controller 109, forwarding 23, preferably wirelessly forwarding, sensor information signals including timestamps and luminaire IDs to the central database, correlating 25 the sensor information signals over a defined period of time, and generating 27 functional classification information based on the correlations found, wherein the functional classification information indicates a likelihood function of a certain usage of each of the luminaires, out of a given set of usage functions.

The method 20 as shown in FIG. 2 further comprises the step of: outputting 29 the usage of each luminaire at a user interface.

In particular, the central database comprises or is connected to a display. The display can be configured to display the user interface.

The correlation 25 and/or classification can additionally be generated based on a location of each luminaire 101a-d, e.g. based on the luminaire ID, on the neighboring luminaires 101a-d, and/or on a recording time of each sensor value.

By taking into account the sensor values, the type of sensed data, a time resolution and a special resolution, the functional classification information can be generated efficiently. Further, the likelihood of the usage as indicated by the functional classification information can dynamically adapt to detected changes in the environment.

In particular, the functional classification can comprise a commissioning and/or a grouping of the luminaires 101a-d.

Preferably, the set of usage functions comprises at least the categories "work space" and "non-work space". The set of room functions can comprise further categories, such as: "meeting room", "laboratory", "hospital room", "storage room", "workshop" or "sales rooms".

In particular, the same luminaire can be used in different ways, e.g. illuminating a small area in a room, e.g. a speaker, or uniformly illuminating the entire room, e.g. during a meeting with many people, depending on the use of the room.

Preferably, the method 20 comprises classifying the luminaires 101a-d by assigning a usage function to each luminaire 101a-d based on the likelihood function. In particular, the assigned usage function comprises a category.

Preferably, a setting or an operation parameter of each luminaire is adapted based on the likelihood function, in particular based on the category, of each luminaire.

In the following, varying settings of the same luminaire 101a-d of the grid 100 for three different categories is described:

If the category "office space" of the luminaire 101a-d is determined with high likelihood, the luminaire 101a-d can be set to a long illumination time when detecting the presence of people, e.g. by a motion sensor of the luminaire 101a-d, and to a slow change of its brightness from bright to dark during activation/deactivation. The luminaire 101a-d can further be set to change a light color during the day according to a preset human centric lighting scheme.

If, in contrast, the category "corridor" of the luminaire 101a-d is determined with high likelihood, the luminaire 101a-d can be set to a short illumination time when detecting the presence of people and to a fast change of its brightness from bright to dark. Further, the luminaire 101a-d can be set to optimal visibility, i.e. no of the light color during the day.

If the category "meeting room" of the luminaire is detected, the luminaire is set to a long lighting duration when detecting the presence of people and to a fast change of the brightness from bright to dark. The luminaire can further be set to change a light color according during the day, according to a human centric lighting.

Preferably, the functional classification information comprises a noise classification with at least two of the classes speech, chatter, burst-type sounds, knocking-tapping-type sounds, white noise, and street noise. In particular, the functional classification information comprises said noise classification for each luminaire 101a-d in the grid 100.

The noise classification can be determined based on output signals, in particular signal values, of the acoustic sensor 105.

In particular, the likelihood function is determined based on the noise classification.

Preferably, the controller 109 is arranged for forwarding the sensor information signals repetitively with a constant or a varying, especially adaptive, frequency.

Preferably, said sensor information signals comprise at least one sensor value, wherein the at least one sensor value represents the amplitude of a corresponding output signal at the time of the associated timestamp.

In particular, the sensor information signals comprise: a time series of radar amplitudes, e.g. frequency and intensity of recorded motions, a time series of sound pressures, and/or a time series of sound pattern probabilities and preferably intensities. The sound pattern can comprise human voice, knocking sounds, burst sounds and/or crowd chatter.

For instance, the acoustic sensor periodically, e.g. every 5 seconds, provides the amplitude of a sound level, which can be used to determine if people are present in a certain room.

The sensor information signals can be forwarded, in particular by the wireless interface 111, using for example the BLUETOOTH® standard. In this way, the emitted sensor information signals can be received with a BLUETOOTH® capable mobile device, e.g. a smartphone, which can act as a gateway device.

The step of correlating 25 the sensor information signals over a defined period of time can comprise comparing the sensor information, in particular data patterns, of different sensors and/or different luminaires 101a-d over time.

The step of generating 27 classification information can comprise associating luminaires by data pattern similarities.

Preferably, the step of correlating 25 the sensor information signals comprises generating a time series of sensor values at different timestamps, and analyzing a duration of the time series and the amplitudes of the sensor values in the time series.

In particular, the functional classification information is generated based on a comparison of the duration of the time series and the amplitudes of the sensor values in the time series with a reference dataset, in particular by means of a supervised learning method and/or a k-nearest neighbor computation.

Preferably, the step of correlating 25 comprises the use of a machine learning technique. The machine learning technique can comprise supervised learning and/or a k-nearest neighbor computation.

Supervised learning can comprise learning a function that maps an input to an output, in particular based on input-output pairs provided as examples.

In particular, the k-nearest neighbor computation is a pattern recognition technique, which comprises generating an output based on an input of k closest training examples, e.g. sensor information signals.

Preferably, the step of correlating 25 the sensor comprises the use of an algorithm that is fed with initial radar sensor data, preferably from the motion sensors 107, combined with a supervised learning k-nearest neighbor algorithm. In particular, the two main parameters in this approach are presence time and transitions count, wherein the presence time indicates the period of time when presence is detected, e.g. someone is sitting or standing, by a radar sensor and the transition count indicates how often movement is detected, e.g. walking or running, by a the radar sensor.

The step of correlating 25 can further comprise generating a labelled training dataset for the supervised learning. The labelled training dataset can be generated based on the knowledge that a high transition count in combination with a short presence time is associated with a non-working space or corridor area, while a low transition count in combination with a long presence time is associated with a working space. Based on this knowledge, linear equations, which represent the behavior described above as transition count and presence time parameters, can be developed.

An input dataset for the k-nearest neighbors algorithm can correspond to transition count and presence time variables of the respective luminaires 101a-d. Preferably, to generate the functional classification information, an input dataset in which the luminaires 101a-d are represented with respective feature values, in particular presence time and transition count, can be labelled based on the predicted output of the k-nearest neighbors algorithm in the categories "working space" or "non-working space".

Figure 3:
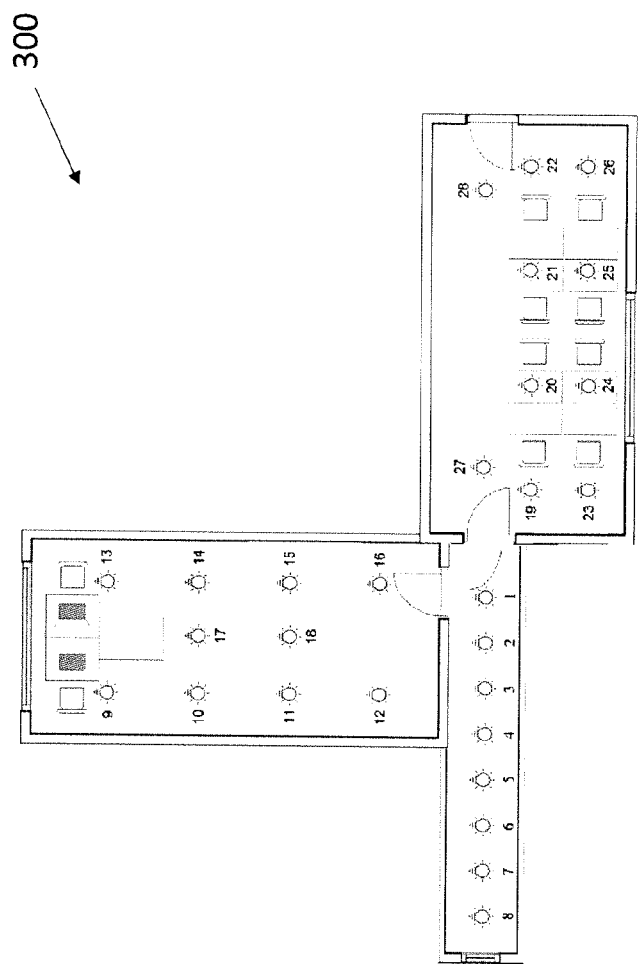
FIG. 3 shows a schematic diagram of an environment in which a luminaire grid is arranged according to an embodiment.

FIG. 3 shows a schematic diagram of an environment 300 in which the luminaire grid 100 is arranged according to an embodiment.

The environment 300 in FIG. 3 comprises three rooms over which the luminaires 1 to 28 of the grid 100 are distributed. Each of the three rooms has a different use. For instance, luminaires 1 to 8 are arranged in a corridor, luminaires 9 to 18 are arranged in a mostly open space, e.g. a lobby, and luminaires 19 to 28 are arranged in a working space, e.g. an office.

The luminaires 1 to 28 can be grouped based on the output signals of the sensors of each luminaire 1 to 28 according to the functional classification method 20 as shown in FIG. 2.

Depending on the usage scenario of each of the three rooms, the respective luminaires 1 to 28 in each room can supply different output signals to the controller 109, which forwards sensor information signals including timestamps and luminaire IDs of the luminaires 1 to 28 to the central database. In the central database, these sensor information signals can be correlated 25 over time to generate 27 the functional classification information, which indicates the likelihood function of the room in which each of the luminaires 1 to 28 is arranged.

For instance, for luminaires 1 to 8 the likelihood function will indicate "non-working space", or more specific "corridor", for luminaires 19 to 28 the likelihood function will indicate "working space", and for luminaires 9 to 18 the likelihood function will indicate "open space".

Figure 4:
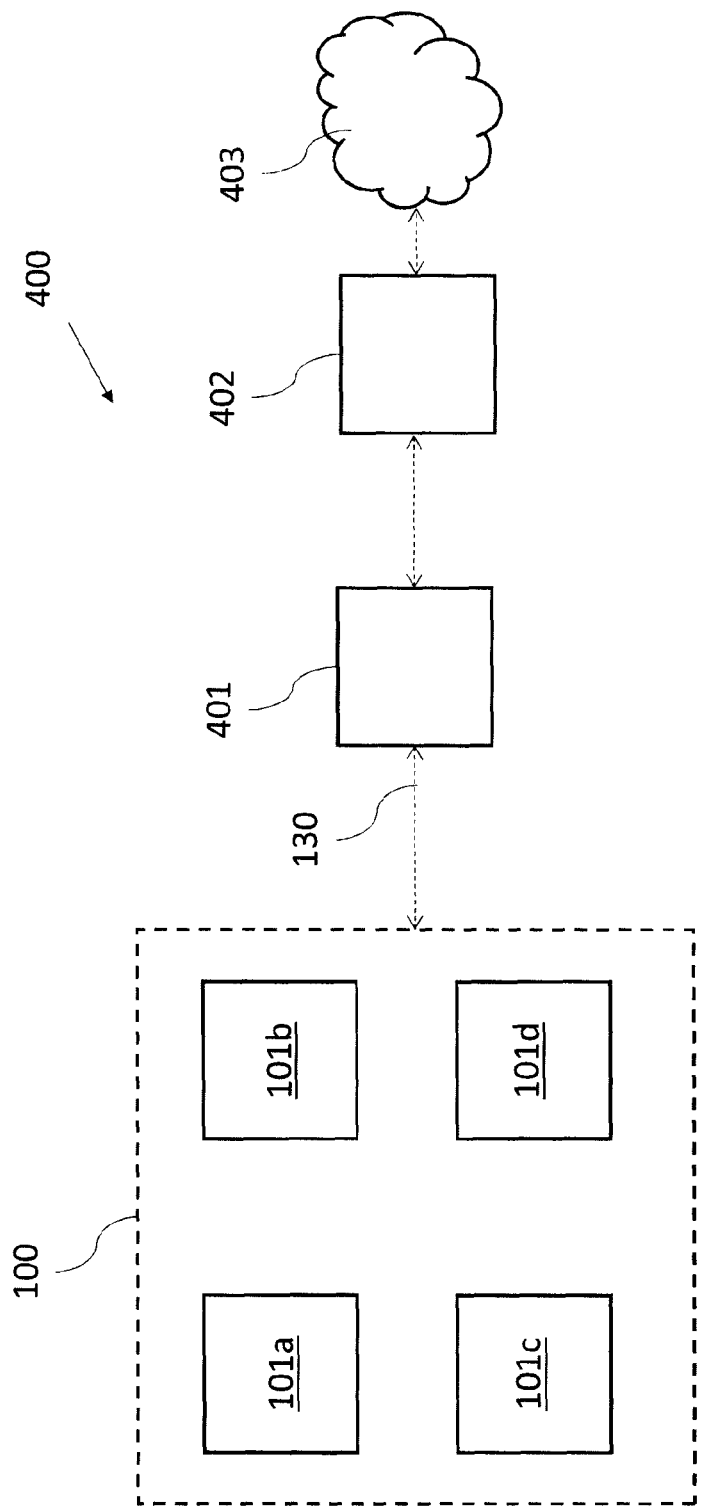
FIG. 4 shows a schematic diagram of a system comprising a grid of a plurality of luminaires according to an embodiment.

FIG. 4 shows a schematic diagram of a system 400 comprising a grid 100 of a plurality of luminaires 101a-d according to an embodiment. In particular, the grid 100 of the system 400 shown in FIG. 4 corresponds to the grid 100 as shown in FIG. 1a.

Each of the luminaires 101a-d of the gird 100 comprises at least two sensors. Preferably, each luminaire 101a-d comprises at least two of: a light sensor 103, preferably a daylight sensor, an acoustic sensor 105 and/or a motion sensor 107. The system 400 further comprises a controller 109 supplied with the output signals of said sensors 103, 105, 107; an interface, preferably a wireless interface 111; a data processing unit 402 and a central database 403.

The interface can be configured to forward sensor information signals 130 including timestamps and luminaire IDs to the central database; wherein the data processing unit 402 can be configured to correlate the sensor information signals 130 in the central database over a defined period of time. The data processing unit 402 can further be configured to generate a functional classification information based on the correlations found, wherein the functional classification information indicates a likelihood function of a certain usage of each luminaire, out of a given set of usage functions.

The system can further comprise a gateway 401. The interface of each luminaire 101a-d can be configured to forward sensor information signals 130 from the sensors 103, 105, 107 of the respective luminaires 101a-d to the gateway 401. The gateway 401 can be configured to forward the received sensor information signals to the central database 403. Preferably, the gateway is a wireless gateway.

The data processing unit 402 can be a computer.

The central database 403 can be a memory of the data-processing unit or of another device. Alternatively, the central database 403 can be a cloud storage.

Figure 5:
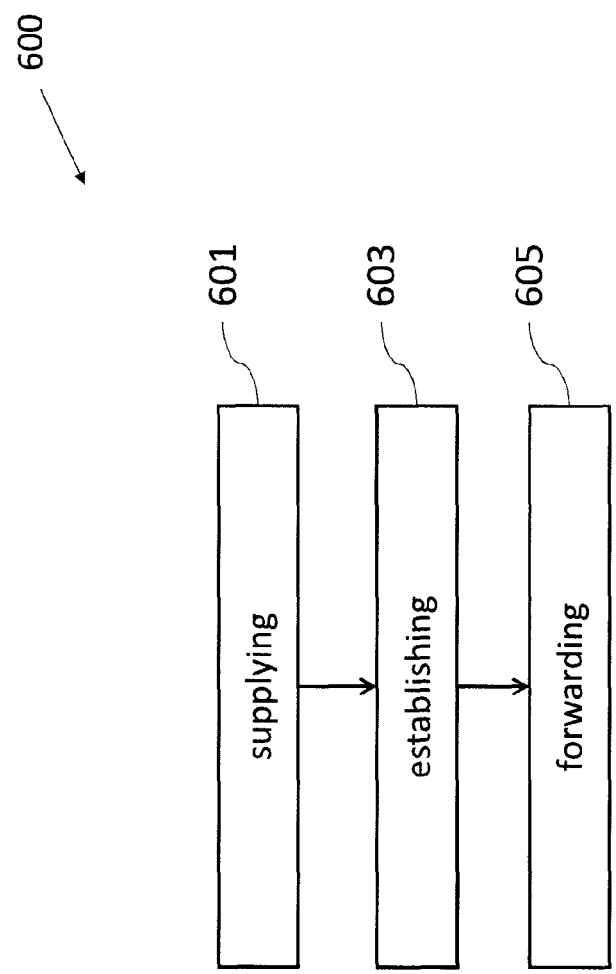
FIG. 5 shows a schematic diagram of a method for operating a grid of a plurality of luminaires.

FIG. 5 shows a schematic diagram of a method 600 for operating a grid 100 of a plurality of luminaires 101a-d.

In particular, the grid 100 of the plurality of luminaires 101a-d correspond to the grid 100 as depicted in FIG. 1a. Each luminaire 101a-d comprises a light sensor 103, preferably a daylight sensor, an acoustic sensor 105, and a motion sensor 107.

The method 600 comprises the steps of:
supplying 601 output signals of luminaires 103, 105, 107 to the controller 109,
establishing 603 a communication connection between the controller 109 and the gateway 401, and
forwarding sensor information signals 130 to the data processing unit 402 and/or the central database 403 by means of the gateway 401.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence. Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only one of the several implementations, such features may be combined with one or more other features of the other implementations as may be desired and advantage for any given or particular application.

The invention claimed is:

1. A method (20) for functional classification of luminaires (101a-d), the luminaires (101a-d) being arranged as a grid (100) of a plurality of luminaires (101a-d), each of the luminaires (101a-d) comprising at least two different sensors (103, 105, 107), said sensors including a motion sensor and an acoustic sensor, the method (20) comprising the steps of:

supplying (21) output signals of said sensors (103, 105, 107) to a controller (109) for the respective luminaire (101a-d), forwarding (23) sensor information signals (130) including timestamps and luminaire IDs from the controllers to a central database (403), wherein sensor information signals (130) including timestamps and luminaire IDs are forwarded wirelessly from the controller to a gateway and then to the central database (403), and said sensor information signals (130) each comprise a sensor value that represents an amplitude of the output signal at the time of the associated timestamp, and further wherein forwarded sensor values for the acoustic sensor comprise only isolated sound amplitude levels, correlating (25) the sensor information signals (130) over a defined period of time, and generating (27) functional classification information based on the correlations found, wherein the functional classification information indicates a likelihood function of a certain usage of each luminaire, out of a given set of usage functions, and wherein the functional classification information comprises a noise classification with at least two of the classes: speech, chatter, burst-type sounds, knocking-tapping-type sounds, white noise, and street noise, and the noise classification along with data from activity sensors is used to determine the likelihood function of a certain usage of each luminaire.

2. The method (20) of claim 1, wherein the set of usage functions comprises at least the categories "work space" and "non-work space".

3. The method (20) of claim 1, wherein each controller (109) is arranged for forwarding the sensor information signals (130) repetitively with a constant or a varying frequency.

4. The method (20) of claim 1, wherein the step of correlating (25) the sensor information signals (130) comprises: generating a time series of sensor values at different timestamps, and analyzing a duration of the time series and the amplitudes of the sensor values in the time series.

5. The method (20) of claim 4, wherein the functional classification information is generated based on a comparison of the duration of the time series and the amplitudes of the sensor values in the time series with a reference dataset, in particular by means of a supervised learning algorithm.

6. The method (20) of claim 4, wherein the functional classification information is generated based on a classification algorithm, comprising a k-nearest neighbor algorithm, or a support vector machine.

7. The method (20) of claim 1, wherein the step of correlating (25) encompasses a supervised learning method and/or a k-nearest neighbor computation.

8. The method (20) of claim 1, wherein said sensor information signals (130) are forwarded using a low-energy, short-range wireless protocol.

9. The method (20) of claim 1, comprising the step of:
outputting (29) the usage of each luminaire, in particular the usage with the highest likelihood, at a user interface.

10. The method (20) of claim 1 wherein said at least two different sensors also comprises a light sensor (103).

11. The method (20) of claim 1, wherein the controller (109) is arranged for forwarding the sensor information signals (130) repetitively with an adaptive frequency.

12. The method of claim 1 wherein the period of the timestamps is 5 seconds or less.

13. A system (400) comprising a grid (100) of a plurality of luminaires (101a-d), each of the luminaires (101a-d) comprising:
at least two different sensors (103, 105, 107), comprising an acoustic sensor (105) and a motion sensor (107);
wherein the system further comprises:
a controller (109) supplied with the output signals of said sensors (103, 105, 107);
a wireless interface (111);
a data processing unit (402) and a central database (403);
wherein the interface is configured to forward sensor information signals (130) including timestamps and luminaire IDs from the controller to the central database (403), and said sensor information signals (130) each comprise a sensor value that represents an amplitude of the respective output signal at the time of the associated timestamp, and further wherein forwarded sensor values for the acoustic sensor comprise only isolated sound amplitude levels;
wherein the data processing unit (402) is configured to correlate the sensor information (130) signals in the central database over a defined period of time; and
wherein the data processing unit (402) is configured to generate a functional classification information based on the correlations found, wherein the functional classification information indicates a likelihood function of a certain usage of each luminaire, out of a given set of usage functions, and wherein the functional classification information comprises a noise classification with at least two of the classes: speech, chatter, burst-type sounds, knocking-tapping-type sounds, white noise, and street noise, and the noise classification along with data from activity sensors is used to determine the likelihood function of a certain usage of each luminaire.

* * * * *